A. D. ELLIOTT.
SEAM WELDING MACHINE.
APPLICATION FILED NOV. 15, 1917.
1,310,610.
Patented July 22, 1919.
3 SHEETS—SHEET 3.
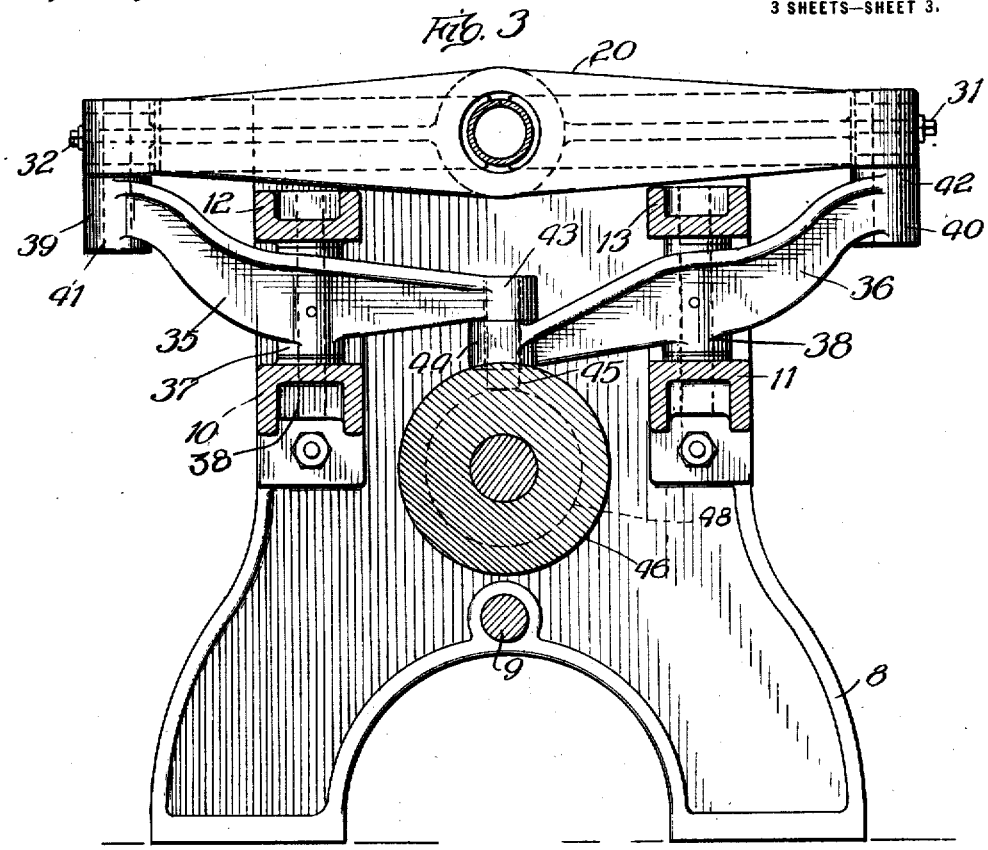
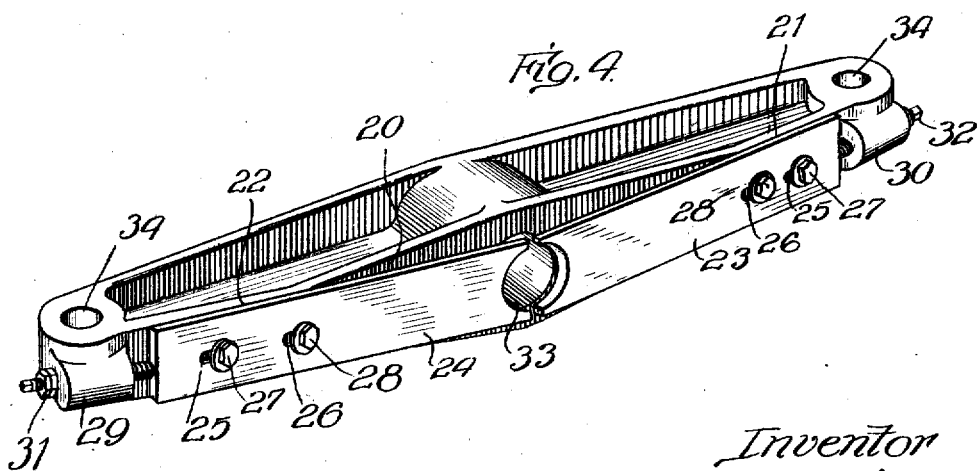
Inventor
Alexander D Elliott
by Rector Hibben Davis and Macauley
his Atty's

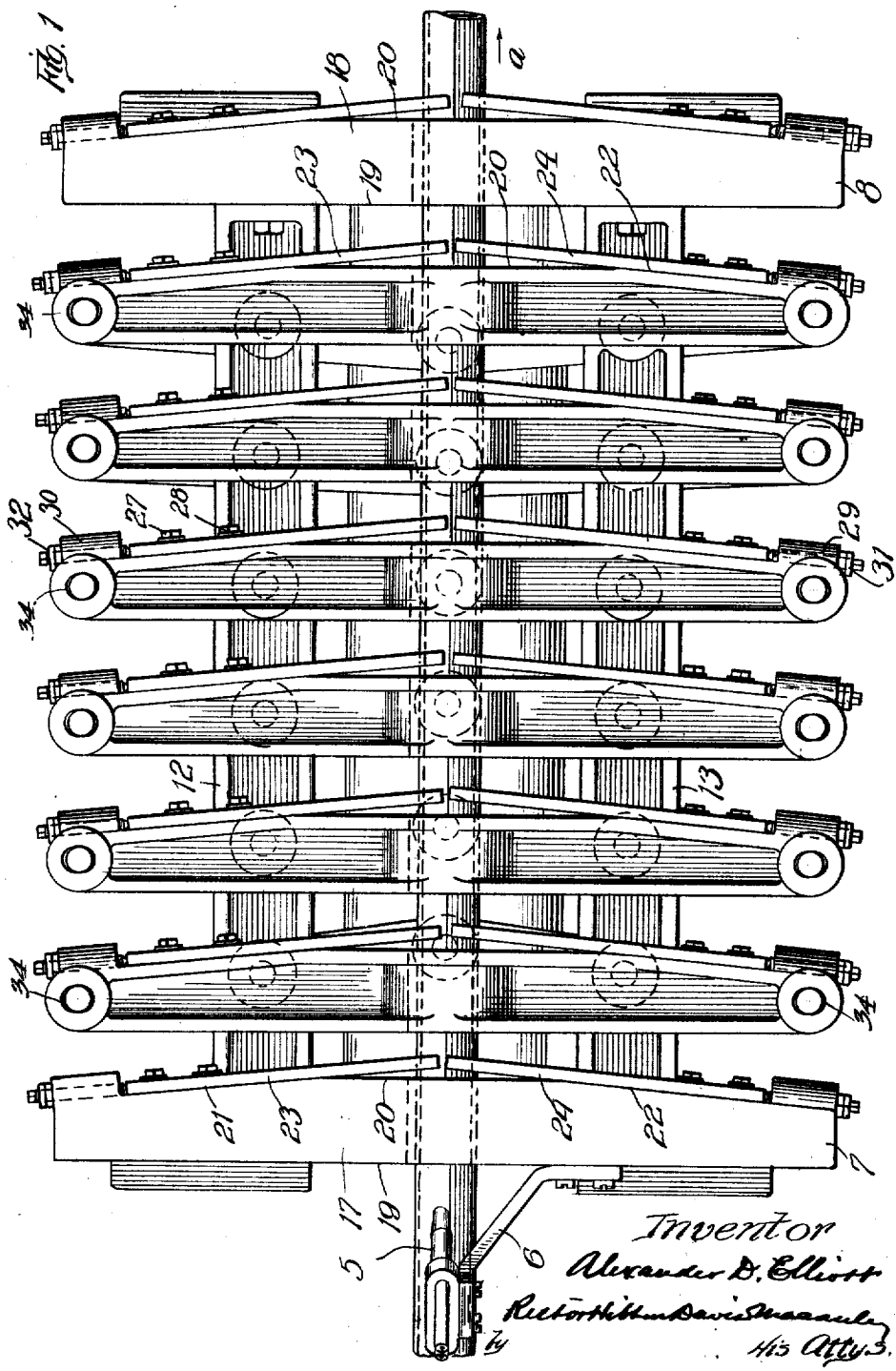

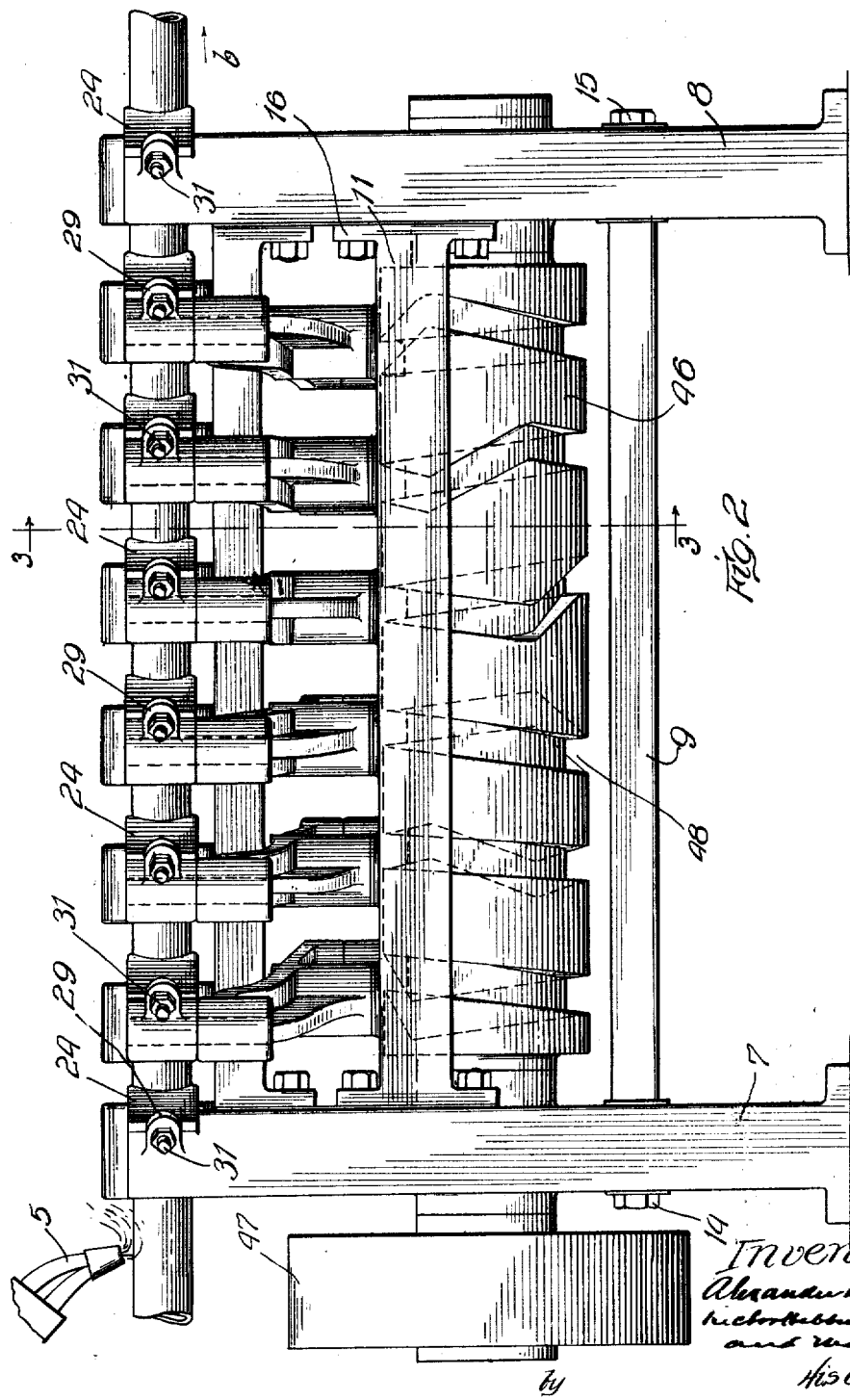

UNITED STATES PATENT OFFICE.

ALEXANDER D. ELLIOTT, OF VIOLA, ILLINOIS.

SEAM-WELDING MACHINE.

1,310,610.  Specification of Letters Patent.  Patented July 22, 1919.

Application filed November 15, 1917. Serial No. 202,190.

*To all whom it may concern:*

Be it known that I, ALEXANDER D. ELLIOTT, a citizen of the United States, residing at Viola, county of Mercer, and State of Illinois, have invented certain new and useful Improvements in Seam-Welding Machines, of which the following is a specification.

In the common practice of forming skelp or seamed tubes, the skelp or blank is rolled or formed into a tube by passing it through a bell or series of bells from the last of which it emerges with its parallel edges substantially in contact. In order to weld these edges together the tube is fed beneath an acetylene or other burner or blow-pipe by which the edges are heated to a welding temperature, and thence through successive pairs of rolls, the function of which is to keep the heated edges in contact with each other until the metal has sufficiently solidified to form a satisfactory joint. The difficulty which has been encountered in machines of this type and which frequently results in defective seams is that no matter how closely the rolls are set, by reason of their required diameter their points of contact with the tubes being welded are so far apart that opportunity is given for the seam to spread between successive pairs of rolls. It is the object of my invention to obviate this difficulty in the machines heretofore used, and to prevent the seam from opening after the metal of the edges has been heated to the welding temperature until the metal has again cooled and solidified. For this purpose I provide a machine in which the tube, after the edges have been heated for forming the seam, is conveyed continuously by clamps which grasp the tube at such close intervals that spreading between the clamps is impossible. The number of clamps employed may be any desired, but it is my intention only to use such a number as will insure the metal being thoroughly set when the pipe is released.

In the accompanying drawings I have shown and in the following specification described a preferred form of my invention. It will be understood, however, that the specific disclosure is for the purpose of exemplification only and that the scope of the invention is defined in the following claims in which I have endeavored to distinguish it from the prior art so far as known to me without, however, relinquishing any portion or feature thereof.

Referring now to the drawings, Figure 1 is a plan view of the preferred form of my invention; Fig. 2 a side elevation thereof; Fig. 3 a cross-section on the line 3—3 of Fig. 2, and Fig. 4 a perspective view of a detail.

As my invention relates purely to the means for clamping the tubes and feeding them along, I have illustrated the heating means conventionally only at 5, in Figs. 1 and 2, in the former of which it is shown as supported on a suitable bracket 6. The frame of the machine may consist, as shown, of cast metal end standards 7, 8, connected by a longitudinal bar 9 and side rails 10, 11, 12, 13, said bar being received at its ends in openings in the standards 7 and 8 and secured therein by nuts 14, 15, and said rails formed with end flanges 16 by which they are bolted to the respective end standards. The above described frame while suitable for the purpose is not essential, as it will be obvious from the following description that the essential elements of the invention, now to be described, may be otherwise mounted provided they are given the necessary support.

At either end of the machine is a stationary clamp and between said clamps is a series of clamps which are movable each a short distance longitudinally of the machine for continuously carrying the pipe being operated upon forwardly from the burner. The upper cross-member 17, 18 of each of the end standards is parallel faced as at 19, 20 at its middle portion, but toward either end its forward face is chamfered away as at 21, 22 to form seats for the clamping plates 23, 24, which are adjustably secured to said cross-pieces in a manner which will best be understood by reference to Fig. 4 showing one of the movable clamp members which, however, is in this respect identical with the stationary clamps. The clamping plates 24, 23, are of heavy, elastic steel and preferably slotted as at 25, 26, to receive bolts 27, 28, by which said plates are held to the movable or stationary clamp members, as the case may be. The clamp members are each formed with ears 29, 30, at their respective opposite ends which are perforated and adapted to receive adjusting bolts 31, 32, bearing upon the outer ends of the clamping plates and by which the latter may be adjusted toward and from each other, the bolts 27, 28 being eased when adjustment is required. The clamping plates extend toward each other beyond the seats and overlap the face 20 of the clamp member, whether stationary or movable, and almost meet at the center thereof where they are formed with semi-circular notches 38. The clamp members are bored or perforated in line with openings between the clamping plates to permit the passage of the tube to be treated therethrough.

The movable clamp members are formed at their respective opposite ends with eyes 34, 34, by which said members are supported upon levers 35, 36, said levers preferably being of the first order and fulcrumed on pins 37, 38, shown in dotted lines in Fig. 3 and extending between the pairs of rails 10, 12 and 11, 13, respectively. Each lever carries at its outer end sockets 39, 40 in which sockets are secured pintles 41, 42, which are received into the eyes 34, 34, of the movable clamp members referred to above. The eyes 34 are elongated longitudinally of the clamp members in order to permit the slight movement of the pintles therein presently to be described. The inner ends of the levers 35, 36 overlap as shown in Fig. 3, the upper lever carrying the pintle 43, which extends through a slot 44 in the inner end of the lever 36, and beyond the same at 45 for a purpose which will presently appear.

A cam shaft 46 is journaled at its opposite ends in the respective end standards 7, 8, and is provided at one end with a driving pulley 47 for turning the same. Substantially in the plane of each pair of levers 35, 36, the cam shaft is formed with a groove 48 which receives the pin 45 of the corresponding pair of levers. Obviously when the shaft is rotated the cam grooves oscillate their respective pairs of levers, and as each pair of levers carries a movable clamp member, the latter are caused to reciprocate longitudinally of the machine. The amplitude of oscillation of the several clamps is restricted in practice to less than the diameter thereof, and each cam groove is so formed as to give its clamp a slow forward movement during the greater portion of the revolution of the cam shaft and then a quick return. Preferably the time of forward feed of each clamp is a multiple of the time of backward movement corresponding to the entire number of clamps so that at any moment all of the clamps but one are moving slowly forward and the exception is moving rapidly backward, the return movement of the clamps being performed *seriatim*.

The clamping plates are so adjusted as to permit the forward movement of the tube therethrough, with a small amount of friction, but to absolutely prevent the rearward movement, and this is true of the clamps on the stationary end frames as well as of the clamping plates on the intermediate movable members.

The pipe to be welded is introduced to the machine at the left as in view in Figs. 1 and 2, and pushed by hand or otherwise through the stationary end, between the ends of the clamping plates thereon and sufficiently far through the first movable member so that the clamping plates on the latter may grasp the tube when said member is in its rearmost position. As the movable clamp member moves forward the clamping plates thereon are bent backward toward the face of said clamp member by their frictional engagement with the pipe which they thus tightly clamp and compress. As the amount of compression of the pipe by each pair of clamping plates depends *inter alia* upon the resistance of the tube to forward movement, this resistance is suitably regulated either by the adjustment of the frictional engagement of the clamp plates with the pipe or by providing other resistance means. In the machine as shown the flame is directed downwardly upon the pipe and the pipe is therefore introduced with the seam uppermost, and thus the successive clamps grasping the tube from opposite sides force its edges together and it is conveyed steadily forward with the clamps bearing upon it at frequent intervals until the metal is so well set that danger of the edges springing apart is past. I have shown six movable clamp members, but a larger or less number may be employed as is found suitable for holding the pipe during the required period.

It will be obvious from the foregoing that the specific construction described can be departed from in a number of respects within the scope of my invention. Thus the order of levers by which the movable clamp members are supported, the specific means for operating them, and the particular form of clamp might be altered or varied within the limits of the invention as defined in the following claims.

I claim:

1. A seam welding machine comprising means for heating a tube and a series of independently movable reciprocating clamps adapted to clamp the tube at short intervals and to move forward therewith, and return for a fresh grip thereon and means for reciprocating the clamps.

2. In a device of the class described, means for heating a tube, a plurality of independently movable clamp members each having a clamping device thereon adapted to clamp the tube when moving in one direction and to move relatively to the tube in contact therewith in the opposite direction, and means for independently oscillating said clamp members.

3. In a device of the class described, a frame, means for heating a seam of a tube thereon, means for holding and feeding a tube with reference to said heating means comprising a series of independently movable clamp members mounted for a reciprocating motion longitudinally of the machine and clamping means on each said clamp member adapted to grip and move with the tube during forward movement of said member and to slide on the tube during the rearward movement thereof.

4. In a device of the class described, a frame, a burner, a relatively stationary clamping device on said frame in line with said burner, a plurality of oscillating clamp members mounted on said frame for independently oscillating movement longitudinally thereof, means for imparting the oscillating movement to said clamp members, and a clamping device on each said movable clamp member adapted to grip a tube during the forward movement of the clamp member and to slide on said tube during the rearward movement of said member.

5. In a device of the class described, a frame, a burner thereon, a series of clamp members each having an independent movement longitudinally of said frame, a pair of resilient clamping plates mounted on each member, the openings between said clamping plates being in line with each other.

6. In a device of the class described, a movable clamping member comprising a rigid body portion, a pair of relatively adjustable, resilient clamping plates mounted on said member, the adjoining ends of said clamping plates being spaced from each other, and means for adjusting said clamping plates toward each other.

7. In a device of the class described, a frame, heating means thereon and a series of independently movable clamps adapted to compress a tube and move in one direction therewith and to move in the opposite direction relatively to the tube.

8. In a device of the class described, a series of clamps mounted to reciprocate in a line, means for reciprocating the clamps, the jaws of said clamps being constantly in line for the passage of a tube therethrough, the jaws being adapted to exert pressure upon the tube at all times and to grip and carry the tube with them when moving in one direction and to severally move relatively to the tube in the opposite direction.

9. In a device of the class described, a series of independently movable clamping members each having a clamp thereon, the jaws of all the members being in line to permit the insertion of a tube therein and adapted to grip and carry the tube in one direction and to move relatively to the tube in the other direction, and means for moving the clamps comprising pivoted levers engaging the respective clamps and cams engaging the levers.

10. In a device of the class described, a series of independently movable clamps arranged in line and adapted to receive and grip a tube when moving in one direction and to move relatively to the tube in the other direction, a pair of levers respectively engaging the opposite ends of each said clamp, and means for moving the levers of each pair in synchronism and moving the several pairs successively.

ALEXANDER D. ELLIOTT.

Copies of this patent may be obtained for five cents each, by addressing the "Commissioner of Patents, Washington, D. C."